United States Patent
Zink

(10) Patent No.: US 10,397,978 B2
(45) Date of Patent: Aug. 27, 2019

(54) METHOD AND SYSTEM FOR SIGNALING OPTIMIZATION OF IP CONNECTION OVER A MOBILE-RADIO NETWORK

(71) Applicant: FLASH NETWORKS, LTD, Herzliya (IL)

(72) Inventor: Roland Zink, Neu-Anspach (DE)

(73) Assignee: FLASH NETWORKS, LTD, Herzliya (IL)

( * ) Notice: Subject to any disclaimer, the term of this patent is extended or adjusted under 35 U.S.C. 154(b) by 240 days.

(21) Appl. No.: 15/342,017

(22) Filed: Nov. 2, 2016

(65) Prior Publication Data
US 2017/0135076 A1 May 11, 2017

Related U.S. Application Data

(60) Provisional application No. 62/251,798, filed on Nov. 6, 2015.

(51) Int. Cl.
| | |
|---|---|
| *H04W 72/04* | (2009.01) |
| *H04W 76/38* | (2018.01) |
| *H04W 76/27* | (2018.01) |
| *H04W 80/06* | (2009.01) |
| *H04L 29/06* | (2006.01) |
| *H04L 29/08* | (2006.01) |

(52) U.S. Cl.
CPC ........... *H04W 76/38* (2018.02); *H04W 76/27* (2018.02); *H04L 67/143* (2013.01); *H04L 69/163* (2013.01); *H04W 80/06* (2013.01)

(58) Field of Classification Search
CPC ..... H04L 67/143; H04L 69/163; H04L 47/14; H04L 47/28; H04L 47/30; H04L 47/50; H04W 76/27; H04W 76/38; H04W 80/06; H04W 28/02
See application file for complete search history.

(56) References Cited

U.S. PATENT DOCUMENTS

| | | | | |
|---|---|---|---|---|
| 6,529,932 | B1 * | 3/2003 | Dadiomov | G06F 9/466 709/201 |
| 6,587,435 | B1 * | 7/2003 | Miyake | H04L 47/10 370/236 |
| 6,954,797 | B1 * | 10/2005 | Takeda | H04L 29/06 709/226 |
| 8,520,694 | B1 * | 8/2013 | Bali | H04L 12/12 370/428 |
| 2007/0106541 | A1 * | 5/2007 | Raisanen | G06F 8/45 705/7.11 |

(Continued)

OTHER PUBLICATIONS

3GPP, "3GPP TS 36.331 version 10.1.0 Release 10", Apr. 2011, 3GPP, version 10.1.0, pp. 1-292 (Year: 2011).*

*Primary Examiner* — Un C Cho
*Assistant Examiner* — Shah M Rahman
(74) *Attorney, Agent, or Firm* — Smith Tempel Blaha, LLC; Gregory Scott Smith

(57) ABSTRACT

A technique for saving cellular resources is disclosed. The technique is implemented at an intermediate network element (NE) that is communicatively coupled between a plurality of cellular devices (CDs) via a cellular network and a plurality of servers via an Internet Protocol (IP) network. The NE is configured to transfer control packets in association with IP packets toward the CD in order to save cellular resources.

15 Claims, 3 Drawing Sheets

(56) References Cited

U.S. PATENT DOCUMENTS

| | | | | |
|---|---|---|---|---|
| 2007/0291749 | A1* | 12/2007 | Taki | H04L 12/14 370/356 |
| 2008/0123658 | A1* | 5/2008 | Hyytia | H04L 45/00 370/395.5 |
| 2013/0064179 | A1* | 3/2013 | Attar | H04W 28/0268 370/328 |
| 2013/0111038 | A1* | 5/2013 | Girard | H04L 45/245 709/226 |
| 2013/0282911 | A1* | 10/2013 | Meylan | H04W 76/32 709/227 |
| 2013/0301418 | A1* | 11/2013 | Ding | H04W 76/27 370/241 |
| 2014/0269269 | A1* | 9/2014 | Kovvali | H04W 24/08 370/229 |
| 2014/0286258 | A1* | 9/2014 | Chowdhury | H04L 1/1812 370/329 |
| 2015/0016261 | A1* | 1/2015 | Backholm | H04L 47/32 370/235 |
| 2015/0071139 | A1* | 3/2015 | Nix | H04W 4/70 370/311 |
| 2015/0127837 | A1* | 5/2015 | Harashima | H04L 67/327 709/227 |
| 2016/0066271 | A1* | 3/2016 | Hong | H04W 52/0225 370/311 |
| 2016/0100454 | A1* | 4/2016 | Murakami | H04W 72/04 370/315 |
| 2016/0254881 | A1* | 9/2016 | Meylan | H04L 1/188 370/216 |
| 2017/0279922 | A1* | 9/2017 | Sharma | H04L 67/1097 |

* cited by examiner

METHOD AND SYSTEM FOR SIGNALING OPTIMIZATION OF IP CONNECTION OVER A MOBILE-RADIO NETWORK

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Nov. 6, 2015 and assigned Ser. No. 62/251,798, which application is incorporated herein by reference in its entirety.

FIELD OF THE DISCLOSURE

The present disclosure generally relates to the field of data communication over a packet switch network such as Internet Protocol (IP) network. More particularly the disclosure relates to communicating IP packets over a cellular network such as but not limited to General Packet Radio Service (GPRS), Universal Mobile Telecommunications System (UMTS) or Long-Term Evaluation (LTE) network.

DESCRIPTION OF BACKGROUND ART

It is well known to a person with ordinary skill in the art that power consumption of a mobile device is an important feature. Therefor in unused services, common mobile device are turned off or placed in a power saving state (idle). An example embodiment of a mobile device can be a cellular phone, smartphone, etc. In LTE networks the radio part power consumption can be reduced by going into a Radio-Resource Control (RRC) idle state. However, switching from off state or idle state to on state (connected state) requires extra signaling and control messages to be transferred over-the-air (OTA) between the mobile device and a base station. The signaling causes overhead in the mobile network.

In addition, the signaling and control impact the amount of users that can be served, at the same time, by the cellular network.

BRIEF SUMMARY

The needs and the deficiencies that are described above are not intended to limit the scope of the inventive concepts of the present disclosure in any manner. The needs are presented for illustration only. The disclosure is directed to a novel technique for reducing the power consumption of a mobile device over a cellular network such as, but not limited to, GPRS, UMTS or LTE networks, as well as decreasing the amount of signaling This enables serving more users at the same time.

An example embodiment of the present disclosure can be implemented by a Network Element (NE). An example of an NE can be located in a GPRS, or in a UMTS, or an LTE Access-Network-Operator Premises (ANOP) in between an access gateway (AGW) and an Internet-Network Gateway (I-GW), etc. An example of an AGW for an LTE network can be an S-Gateway (SGW) or P-GW. In other embodiments of the disclosed technique, an embodiment of an NE can be installed at the connection between the I-GW and the Internet. An example of an NE can be configured to improve the power consumption of connected mobile devices by responding to a connection-close message (CCM) and control traffic on behalf of the mobile devices, which are in idle state. In addition, the NE can reduces network overhead, which is due to the signaling and the radio connection.

For the purposes of simplicity and readability the present disclosure relates in more details to an LTE access network as an example of an access network, however a person having an ordinary skill in the art can adapt the disclosed technique to other type of access networks.

An example embodiment of the present disclosure monitors the cellular device (CD) state. Upon determining that the CD is in idle mode, the example embodiment of the NE may impersonate the CD and respond to a close-connection message (CCM) sent from an internet server. An example of CCM can be a TCP FIN message sent from an IP server. Responding to the CCM message, on behalf of the CD, saves RRC messages and state changes required by a CD when it switches from idle state to a connected state. In addition, responding on behalf of the CD increases the efficiency of the access network that uses less RRC connections. Along the present disclosure and the claims the terms mobile device and cellular device may be used interchangeably. Along the present disclosure and the claims the terms FIN message or CCM may be used interchangeably.

An example of CCMs can be a TCP packet with the FIN flag set. Another example of CCM can be TLS-close alert followed by a TCP FIN message. Yet another example of CCM can be HTTP2 Go-away message followed by a TLS close message followed by TCP close message (FIN), etc.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, exemplary embodiments of the present disclosure are described. For convenience, only some elements of the same group may be labeled with numerals. The purpose of the drawings is to describe exemplary embodiments and not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1:
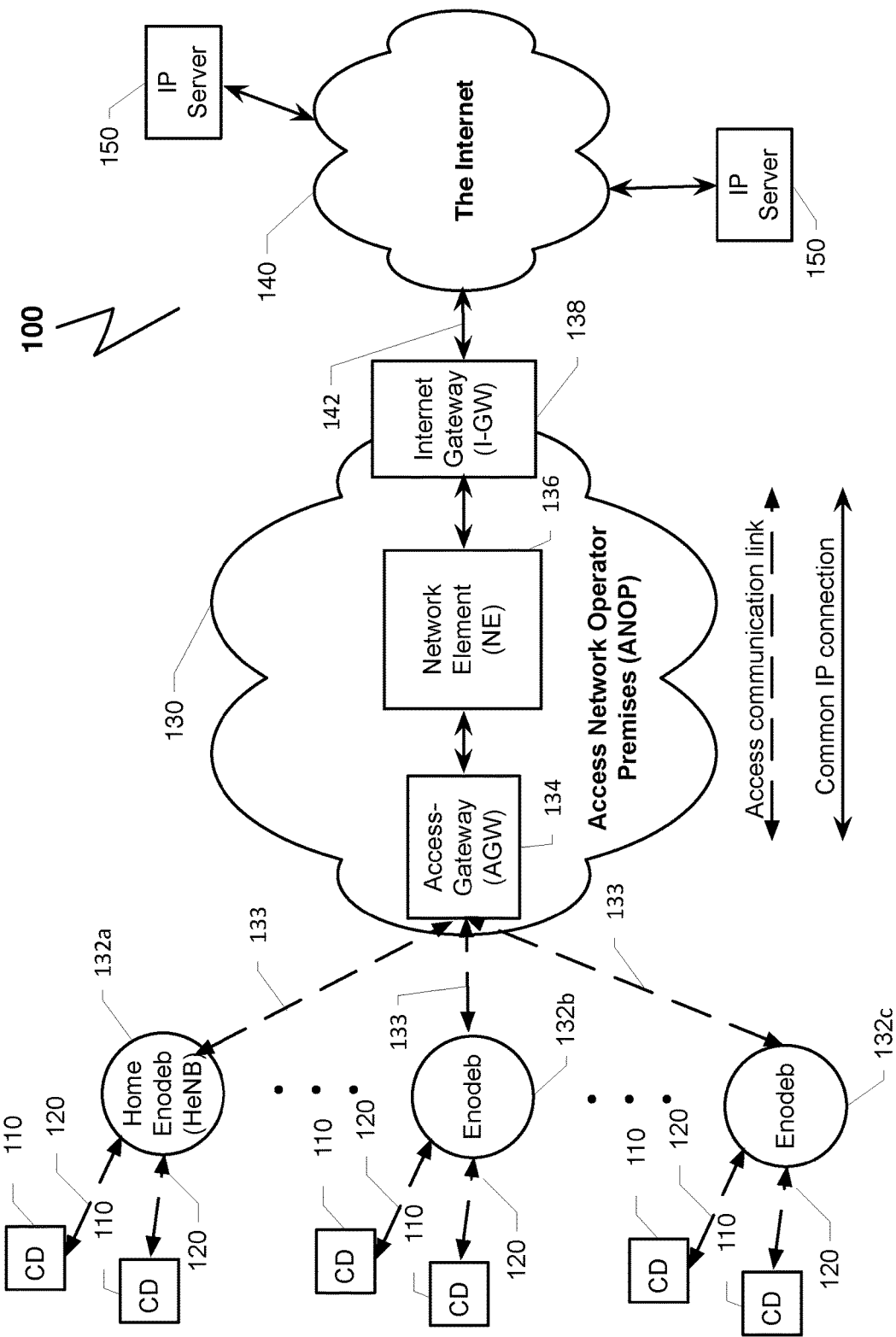
FIG. 1 illustrates a block diagram with relevant elements of an example Access Network Operator Premises (ANOP) in which an exemplary embodiment of the present disclosure can be implemented.

FIG. 1 depicts a block diagram with relevant elements of an exemplary communication system 100 in which an exemplary embodiment of the present disclosure can be implemented. Communication system 100 can be configured to handle data-packet traffic over TCP/IP network, for example. Communication system 100 can comprise an Access Network Operator Premises (ANOP) 130, a plurality of cellular-devices (CD) 110, a plurality of intermediate nodes (not shown in the figures), the Internet 140, and one or more IP servers 150. The ANOP 130 can be connected to the Internet 140 via an Internet Gateway (I-GW) 138 and a communication link 142. An example of ANOP 130 can be the access network of a GPRS cellular operator, LTE cellular operator, etc.

A few non-limiting examples of typical cellular-device (CD) 110 can be: a laptop, a mobile phone, a PDA (personal digital assistance), a smart phone, a tablet computer, one or more type of sensors, connected vehicles, Internet-of-Things (IOT) etc. Each CD 110 may employ a browser application. Following are few not limiting examples of browser applications: Firefox (a trade name of Mozilla), Apple-Safari (a trade name of Apple Inc.), Google-Chrome (a trade name of Google Inc.), etc.

A CD 110 can be connected to an access gateway (AGW) 134 via intermediate nodes such as Enodeb 132*b*&*c* or Home enodeb (HeNB) 132*a* and a backhaul network 133. A non-limiting example of an AGW 134 can be an S-GW or P-GW. Along the disclosure and the claims the term AGW and S-GW can be used interchangeably. The connection between a CD 110 and the intermediate nodes 132*a-c* can be implemented by cellular links 120.

An ANOP 130 can provide different services to a plurality of CDs 110. A few non-limiting examples of services provided by an ANOP 130 can include: spam filtering, content filtering, bandwidth consumption distribution, transcoding, rating adaptation, power saving etc. Among other elements, an example ANOP 130, which is configured to implement an example embodiment of the disclosed technique, may comprise one or more AGWs 134 such as, but not limited to, S-GW, an NE 136, and Internet gateway (I-GW) 138. In other embodiments of the disclosed technique (not shown in the figures), an embodiment of an NE 136 can be installed over the communication link 142 between the I-GW 138 and the Internet 140.

Among other tasks, an examplary AGW 134 can be configured to identify a requesting CD 110 at its ingress to the ANOP 130 and to process the data traffic to or from the plurality of CDs 110 via the one or more intermediate nodes 132*a-c*. In the direction from the CD 110 toward the internet 140, the AGW 134 can be configured to transfer IP traffic toward the NE 136. An exemplary AGW 134 can be an S-GW for an LTE network, another example of AGW can be a P-GW. The AGW 134 can be configured to identify the subscriber and accordingly can determine whether the subscriber is allowed to get the required access to the network and what services the subscriber is entitled to receive, for example. In addition, the AGW 134 may participate in a process of allocating one or more public IP addresses to the requesting CD 110 to be used during the current access session.

In some embodiments of the system 100 the AGW 134 can be configured to handle the mobility management of CDs 110 and implement signaling channel over the backhaul network 133 for paging and mapping each CD 110 to its currently associated Enodeb 132*a-c*. The I-GW 138, at the other side of ANOP 130 can be a router, for example. The I-GW can route IP data packets to and from the plurality of IP servers 150 via the Internet 140. The communication between the I-GW 138 and the Internet 140 can be based on Internet protocol (IP).

An example embodiment of NE 136 can be configured to reduce the amount of signaling and radio connection time of CDs 110. Some embodiments of NE 136 can be configured to identify that certain CDs 110 are in idle mode. Upon determining that a CD 110 is in idle mode, an example embodiment of NE 136 can be configured to respond to signaling and control on behalf of that CD. For example, an example of NE 136 can respond to a CCM sent from one of the IP servers 150 toward a certain CD 110 on behalf of the certain CD 110.

Responding on behalf of the CD 110 improves the power consumption of the relevant CD 110 as well as reducing the amount of radio connections 120 between the intermediate nodes 132*a-c* and the CDs 110. Reducing the amount of radio connections, enables serving more CDs 110 over the cellular network. More information on the operation of an example of NE 136 is disclosed below in conjunction with FIG. 2 and FIG. 3.

Figure 2:
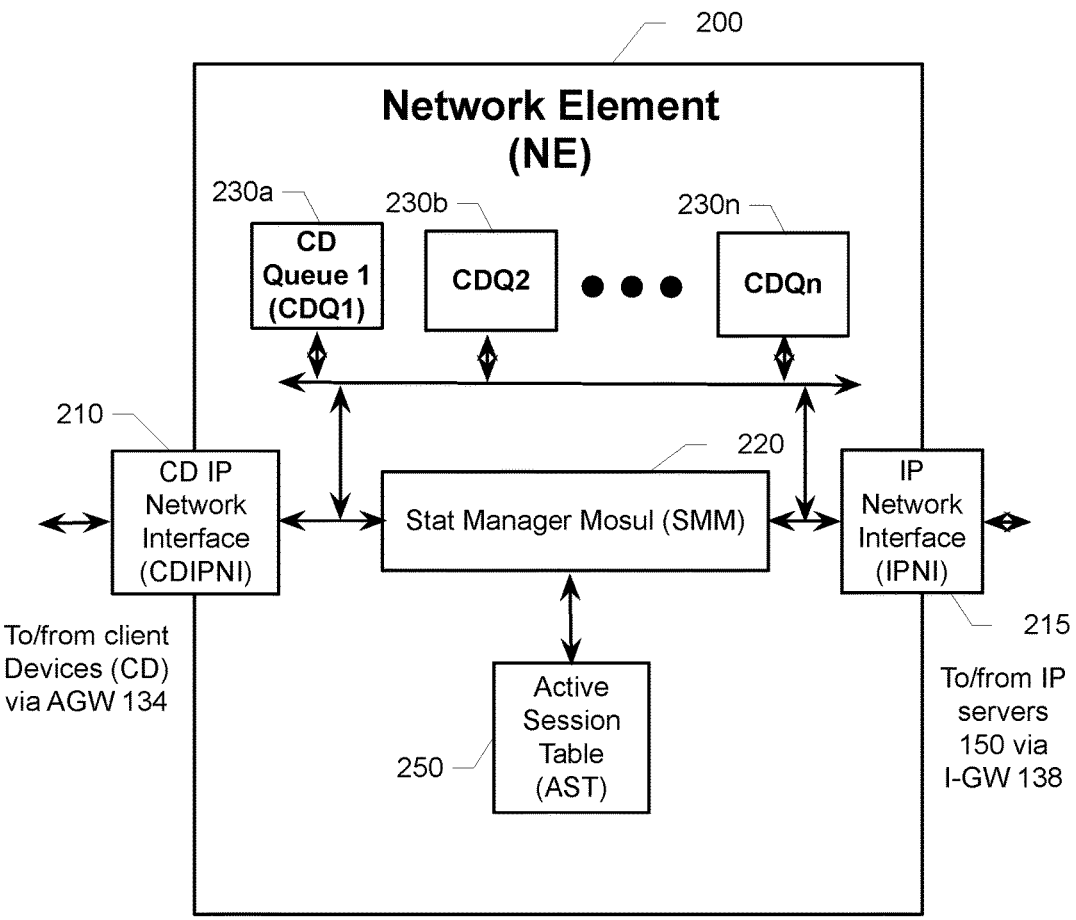
FIG. 2 illustrates a block diagram with relevant elements of an example of a Network Element (NE), according to the teaching of the present disclosure.

FIG. 2 depicts a block diagram with relevant elements of an example embodiment of a NE 200. An example embodiment of NE 200 may comprise one or more processors, computer readable medium such as but not limited to a read/write hard disc, CDROM, Flash memory, ROM, or other memory or storage devices, etc. Software of a logical module may be embedded on one of the computer readable medium. In order to execute a certain task, a software program may be loaded to an appropriate processor as needed. An example of an NE 200 can be divided into few logical modules such as but not limited to a State-Manager-Module (SMM) 220; an active session table (AST) 250, which is stored in a memory device; an CD IP network interface (CDIPNI) 210; one or more CD1 to CDn queues 230*a-n*; and IP network interface (IPNI) 215, for example. Each queue 230*a-n* can be stored in one or more memory devices or in the same memory device.

IP packets obtained from CD 110 via the AGW 134 can be parsed by CDIPNI 210. Based on the header of the packet, the CDIPNI 210 can define the session to which the packet belongs. A session can be identified by the destination address and by the source address or other session detection methods. Then, the AST 250 can be searched looking for an entry that is associated with that session. If an entry does not exist, which means that the session is a new one, then the CDIPNI 210 can allocate an entry for the new session in the AST 250. Next, the relevant fields of that entry can be updated. Fields, such as but not limited to, source address and port number, destination address and port number, domain name, the packet receiving time, RRC state (idle or active), etc. Then, the packet or a pointer to the packet can be transferred toward a queue of the SMM 220. In an alternate embodiment, if an entry, in AST 250, does not exist, then the CDIPNI 210 may transfer the packet to the queue of the SMM 220.

If an entry in the AST 250 exists, then the entry can be parsed and be updated with information regarding the received packet. Information such as but not limited to the receiving time, type of the packet; is it a handshake packet, a status packet, a $1^{st}$ data request packet or others. Next the packet can be transferred toward the relevant CD queue (CDQ1-CDQn) 230*a-n*.

IP packets obtained from IP servers 150 via the I-GW 138 can be parsed by IPNI 215. Based on the header of the packet, the IPNI 215 can define the session to which the packet belongs. Then, the AST 250 can be searched looking for an entry that is associated with that session. Based on the found entry the packet or a pointer to the packet can be transferred toward the relevant queue CDQ 230*a-n*.

An example of SMM 220 can be configured to manage the entire operation of the NE 200. During initiation, SMM 220 can allocate the computing and the storage (memory volume) resources per each module of NE 200. In some embodiments the SMM 220 can be further configured to handle new sessions that are not recorded in the AST 250. In such embodiment, an example of SMM 220 can be configured to operate according to an example method, which is disclosed below in conjunction with FIG. 3.

Figure 3:
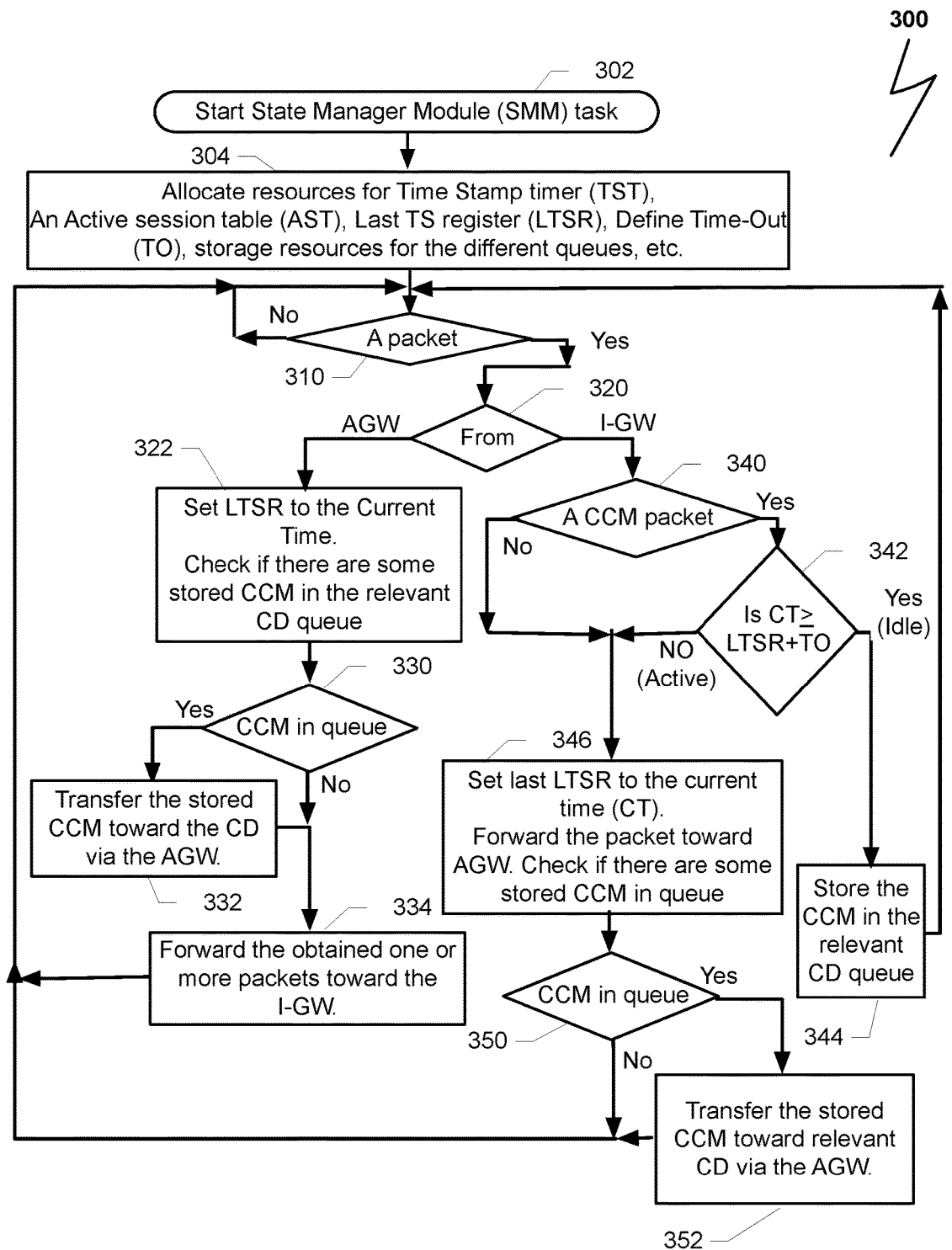
FIG. 3 illustrates a flowchart with relevant actions of an example process that can be implemented by an example NE that is located in an access network of an LTE network.

FIG. 3 illustrates a flowchart with relevant actions of an example of a novel process 300 for handling CCM response packets from a server toward a client at a mobile device. An example process 300 can be implemented by an example of SMM 220 (FIG. 2). In general, the process can be initiated after power on and be executed as long as the NE 200 is active. Upon initiation 302, resources for handling the disclosed system can be allocated 304 and a Time-Out (TO) value can be set. Resources, such as but not limited to, storage resources, timers, registers, computing resources, networking resources, etc. The value of the TO can be a configurable value, which can be dependent on the type of the network, 3G, LTE, etc. After allocating the resources, process 300 may check its allocated queue of SMM 220 in order to determine 310 whether a packet was obtained. If there is no packet in the queue, then the process may wait for a certain period and recheck 310 its queue.

If 310 a packet exists in the queue, then the next packet can be fetched, parsed and a decision can be made 320 whether the packet is obtained from the AGW 134 via CDIPNI 210 or from the I-GW 138 via IPNI 215 (FIGS. 1 and 2 respectively). Upon obtaining 320 a packet from the AGW 134, a last timestamp register (LTSR) can be set 322 to the current time and a CCM queue can be checked in order to determine 330 whether the queue comprises one or more stored CCM packets directed toward the same CD 110 (FIG. 1). If 330 yes, then the stored one or more CCM packets, which were sent from the one or more IP servers 150 (FIG. 1) can be transferred 332 toward the mobile device via CDIPMI 210 and process 300 proceed to block 334 and forward the obtained and the stored CCM (if exist) toward the CD. Sending 332 the stored CCM toward the mobile device utilizes the advantage that an RRC connection has been already set with the mobile device.

Returning now to block 330, if there is no CCM packet in the queue, then the process 300 can proceed directly to block 334. At block 334 the received packet from the AGW 134 (FIG. 1) can be transferred 334 toward the relevant web server 150 via I-GW 138 (FIG. 1). Next, process 300 can return to block 310 looking for the next packet in the queue of SMM 220.

If a packet exists in the queue 310, then the next packet can be fetched, parsed and a decision can be made 320 whether the packet is obtained from the AGW 134 or the I-GW 138. Upon obtaining 320 a packet from the I-GW 138, the packet can be parsed and a decision can be made 340 whether the obtained packet is a CCM packet, which was obtained from the Internet 140. If 340 the packet is not a CCM packet, then at block 346 the LTSR can be set to the current time (CT) and the obtained packet from the I-GW 138 can be transferred toward the AGW 134. In addition at block 346, the relevant CCM queue can be checked for determining whether a CCM packet is stored in the queue.

If 350 one or more CCM packets are stored in the queue, then the stored CCM packet can be transferred 352 toward the mobile device via AGW 134. Sending the CCM packet, substantially together with the obtained packet, utilizes the advantage that an RRC connection has been already set with the mobile device. If 350 there is no CCM packet stored in the queue, then process 300 returns to block 310 for handling the next packet.

Returning now to block 340, if the obtained packet from I-GW 138 is a CCM packet, then in order to determine whether the device is in idle mode or in active mode, process 300 can check 342 whether the current time (CT) is equal or larger than the value stored in LTSR plus the defined time out (TO), If 342 yes (the current time is larger than LTSR+TO, which can be used as an indication for an idle mode), then process 300 proceed to block 344 and stores the obtained CCM packet. Next an acknowledge packet can be return to the web server by the SMM 220 via IPNI 215. After storing 344 the CCM packet, process 300 can return to block 310 for handling the next packet in the queue.

If 342 the current time is smaller than LTSR+TO, which can indicate that the device is active, then process 300 proceed to block 346 and can set the LTSR to the current time (CT) and transfer the obtained CCM packet with stored CCM packets, if 350 exist, toward the AGW 134.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein".

The invention claimed is:

1. A method comprising:
   (a) employing, a network element (NE) that is communicatively coupled between a plurality of cellular devices (CDs) via a cellular network and a plurality of servers via an Internet Protocol (IP) network; and
   (b) configuring the NE for:
   obtaining a control message sent from a first server, from the plurality of servers, toward a first CD from the plurality of CDs;
   determining whether the first CD is in idle mode by comparing the time interval between the current time (CT), in which the control message was obtained, and the time value that is stored in a last timestamp register (LTSR) and indicates the time in which the last packet from the first CD had been obtained, if the time interval is bigger than a defined time out (TO) the first CD is considered to be in idle mode;
   storing, upon determining that the first CD is in idle mode, the obtained control message in a computer memory device that is associated with the NE;
   determining that another IP packet is sent toward the first CD; and
   transferring the stored control message in association with the another IP packet toward the first CD via the cellular network;
   (c) wherein storing the obtained control message saves the needs to reestablish the radio connection with the first CD, which is considered to be in idle mode.

2. The method of claim 1, wherein the cellular network is a Long-Term Evaluation (LTE) cellular network.

3. The method of claim 1, wherein the control message is a connection-close message (CCM).

4. The method of claim 3, wherein the CCM is a TCP FIN message.

5. The method of claim 1, wherein the CD is a mobile phone.

6. The method of claim 1, wherein the NE transfers the stored control message toward the first CD when the time of storing the control message exceeds a certain time-out period.

7. The method of claim 1, wherein the NE stores the control message when the NE determines that the CD is in Radio-Resource Control (RRC) idle mode.

8. A method comprising:
   (a) employing, a network element (NE) that is communicatively coupled between a plurality of cellular devices (CDs) via a cellular network and a plurality of servers via an Internet Protocol (IP) network; and
   (b) configuring the NE for determining when a first CD from the plurality of CDs is in idle mode by comparing the time interval between the current time (CT), in which a control message is obtained, and the time value that is stored in a last timestamp register (LTSR) and indicates the time in which the last packet from the first CD had been obtained, if the time interval is bigger than a defined time out (TO) the first CD is considered to be in idle mode; and
   (c) storing, upon determining that the first CD is in idle mode, the obtained control message in a computer memory device that is associated with the NE;
   (d) receiving an IP packet which is sent toward the first CD; and
   (e) transferring the stored control message in association with the received IP packet toward the first CD via the cellular network.

9. A computer readable memory device comprising instructions,
   which when executed cause a processor, at network element (NE) that is communicatively coupled between a plurality of cellular-device (CDs) over a cellular network and a plurality of web servers over an IP network, for:
   a. obtaining a control message sent from a first Webserver, from the plurality of webservers, toward a first CD from the plurality of CDs;
   b. determining whether the first CD is in idle mode by comparing the time interval between the current time (CT), in which the control message was obtained, and the time value that is stored in a last timestamp register (LTSR) and indicates the time in which the last packet from the first CD had been obtained, if the time interval bigger than a defined time out (TO) the first CD is considered to be in idle mode;
   c. storing, upon determining that the first CD is in idle mode, the obtained control message in a computer memory device that is associated with the NE;
   d. receiving an IP packet for the first CD;
   e. in response to receiving the IP packet, the NE transferring the stored control message toward the first CD along with the received IP packet; and
   f. transferring the stored control message toward the first CD via the cellular network, whereby communications are delivered to the first CD more efficiently; and
   g. wherein storing the obtained control message saves the needs to reestablish the radio connection with the first CD, which is considered to be in idle mode.

10. The computer readable memory device of claim 9, wherein the cellular network is a Long-Term Evaluation (LTE) cellular network.

11. The computer readable memory device of claim 9, wherein the control message is a connection-close message (CCM).

12. The computer readable memory device of claim 11, wherein the CCM is a FIN message.

13. The computer readable memory device of claim 9, wherein the CD is a mobile phone.

14. The computer readable memory device of claim 9, wherein the instruction of determine by NE when to transfer the stored CCM message toward the first CD further comprises the instruction to determine that another IP packet is sent toward the first CD.

15. The computer readable memory device of claim 9, wherein the instruction to store the obtained CCM message in association with the NE is implemented when the NE determines that the CD is in idle mode.

* * * * *